United States Patent [19]
Kuo

[11] Patent Number: 5,383,999
[45] Date of Patent: Jan. 24, 1995

[54] METHOD FOR MANUFACTURING HIGH HARDNESS KRAFT PAPER-MADE BOARD BLOCK

[75] Inventor: Shin C. Kuo, Changhua City, Taiwan, Prov. of China

[73] Assignee: Ta Yen Paper Box Container Co., Ltd., Changhua City, Taiwan, Prov. of China

[21] Appl. No.: 166,867

[22] Filed: Dec. 15, 1993

[51] Int. Cl.6 .................. B32B 31/00; B32B 29/00
[52] U.S. Cl. .................. 156/267; 156/250; 156/272.2; 156/275.7; 156/278; 156/280; 428/116
[58] Field of Search .............. 428/116, 308.8; 156/250, 267, 272.2, 273.7, 275.7, 278, 280

Primary Examiner—David A. Simmons
Assistant Examiner—M. Curtis Mayes
Attorney, Agent, or Firm—Browdy and Neimark

[57] ABSTRACT

A method for manufacturing hard kraft paper-made board block, wherein multiple layers of carton boards with large thickness are closely attached to one another by glue to form a thick board; and then multiple layers of three-layer corrugated boards having high strength and are made of A-class flock paper and kraft paper with high basic weight are attached in sequence to the thick board by glue, the multiple layers of three-layer corrugated boards forming an intermediate board; then another thick board and intermediate board are further attached to the first intermediate board; and finally an upmost layer of thick board is attached to the last intermediate board. Thereafter, the laminated board block is heated by high frequency and compressed and quickly dried and patterned to form a solid board block. Thereafter, a board with a preset width is cut away from the board block according to requirements. This board is horizontally placed together with the carton boards and the waved intercrossed ribs in the corrugated boards, the compression-resistance of the board exceeds 90% of that of the timber-made board. After coating the external surface of the board with thermo-melting glue, the hardness and compression-resistance thereof almost reach 100% of those of the timber-made board.

2 Claims, 2 Drawing Sheets

METHOD FOR MANUFACTURING HIGH HARDNESS KRAFT PAPER-MADE BOARD BLOCK

BACKGROUND OF THE INVENTION

The present invention relates to a method for manufacturing high hardness kraft paper-made board block. A part of the board block can be cut therefrom to serve as a scaffold board instead of a timber-made scaffold board. In the method of the present invention, multiple layers of carton boards with high thickness are closely attached to one another by white glue or amyloid glue to form a thick board, and then multiple layers of three-layer corrugated boards which have high strength and are made of A-class flock paper and kraft paper with high basic weight are attached in sequence on the thick board by white glue or amyloid glue, wherein the multiple layers of three-layer corrugated boards form an intermediate board, and then another thick board and another intermediate board are twice further attached on the first intermediate board, and finally an upmost layer of thick board is attached on the last intermediate board. Thereafter, the laminated board block is heated by high frequency and compressed and quickly dried and patterned to form a solid assembled board block structure. by means of the high strength of the carton board and the gluing and hardening effect of the assistant white glue, the hardness of the produced board block reaches about 50–60% of the hardness of the timber-made board. Thereafter, a piece of board with a predetermined width is cut away from the board block according to requirements of use. The piece of board is horizontally placed and by means of the carton boards and the waved intercrossed ribs in the corrugated boards, the compression-resistance of the board is almost over 90% of that of the timber-made board. After a thermo-melting glue is painted on the external surface of the board, the hardness and compression-resistance thereof are almost 100% of those of the timber-made board.

A conventional scaffold board is used as a pad disposed under an article to keep the same at a position above the ground so that a forklift can easily lift and displace the article for package or storage. The scaffold board is often made of timbers which are connected together by nails. Such scaffold board has a considerably heavy weight so that it is difficult to displace or drag the scaffold board. Moreover, the timbers connected by nails are liable to break apart due to collision, causing damage of the article placed thereon. Therefore, the using life of the timber-made scaffold board is short and the discarded ones are not recoverable for reproduction. Furthermore, the timbers are obtained by hacking the trees in the forest so that the area of the denuded forests will increase to cause the problem of environment protection. Also, the cost of conventional scaffold board is relatively high so that the competitive ability of the manufacturer will be reduced.

Therefore, it is necessary to provide an improved recoverable scaffold board which has light weight and can be easily manufactured at lower cost without causing the problem of environment protection.

SUMMARY OF THE INVENTION

It is a primary object of the present invention to provide a method for manufacturing high hardness kraft paper-made board block which can serve as a scaffold board instead of conventional timber-made scaffold board.

It is a further object of the present invention to provide the above method, wherein the scaffold board has lighter weight and simple structure and is manufactured at lower cost so that the price thereof is reduced.

It is still a further object of the present invention to provide the above method, wherein the scaffold board can be automatically mass-produced.

It is still a further object of the present invention to provide the above method, wherein the scaffold board can be recovered for reproduction so that the no pollution of environment will be caused.

According to the above objects, the method of the present invention includes the following steps:

Board-laminating procedure: four ( or more or less, depending on the load to be born ) layers of carton boards with high thickness and a basic weight of 700 g/m$^=$ are closely attached to one another by white glue or amyloid glue to form a thick board, and then eight ( or more or less, depending on the load to be born ) layers of three-layer corrugated boards which have high strength and are made of A-class flock paper and kraft paper with high basic weight are attached in sequence on the thick board by white glue or amyloid glue, wherein the multiple layers of three-layer corrugated boards to form an intermediate board, and then another thick board and another intermediate board are twice further attached on the first intermediate board, and finally an upmost layer of thick board is attached on the last intermediate board.

High frequency drying and patterning procedure: the laminated board block is heated by high frequency and compressed and quickly dried and patterned to form a solid assembled board block. By means of the high strength of the carton board and the gluing and hardening effect of the assistant white glue ( amyloid glue ), the hardness of the produced board block reaches about 50–60% of the hardness of the timber-made board.

Cutting procedure: a piece of scaffold board with appropriate width is cut away from the board block according to the requirement of use. The scaffold board is horizontally placed, by means of the carton boards and the waved intercrossed ribs in the corrugated boards, the compression-resistance of the scaffold board is almost over 90% of that of the timber-made scaffold board. After a thermo-melting glue is painted on the external surface of the scaffold board, the hardness and compression-resistance thereof are almost 100% of those of the timber-made scaffold board.

The present invention can be best understood through the following description and accompanying drawing, wherein:

DETAILED DESCRIPTION OF THE PREFERRED EMBODIMENT

Figure 1:
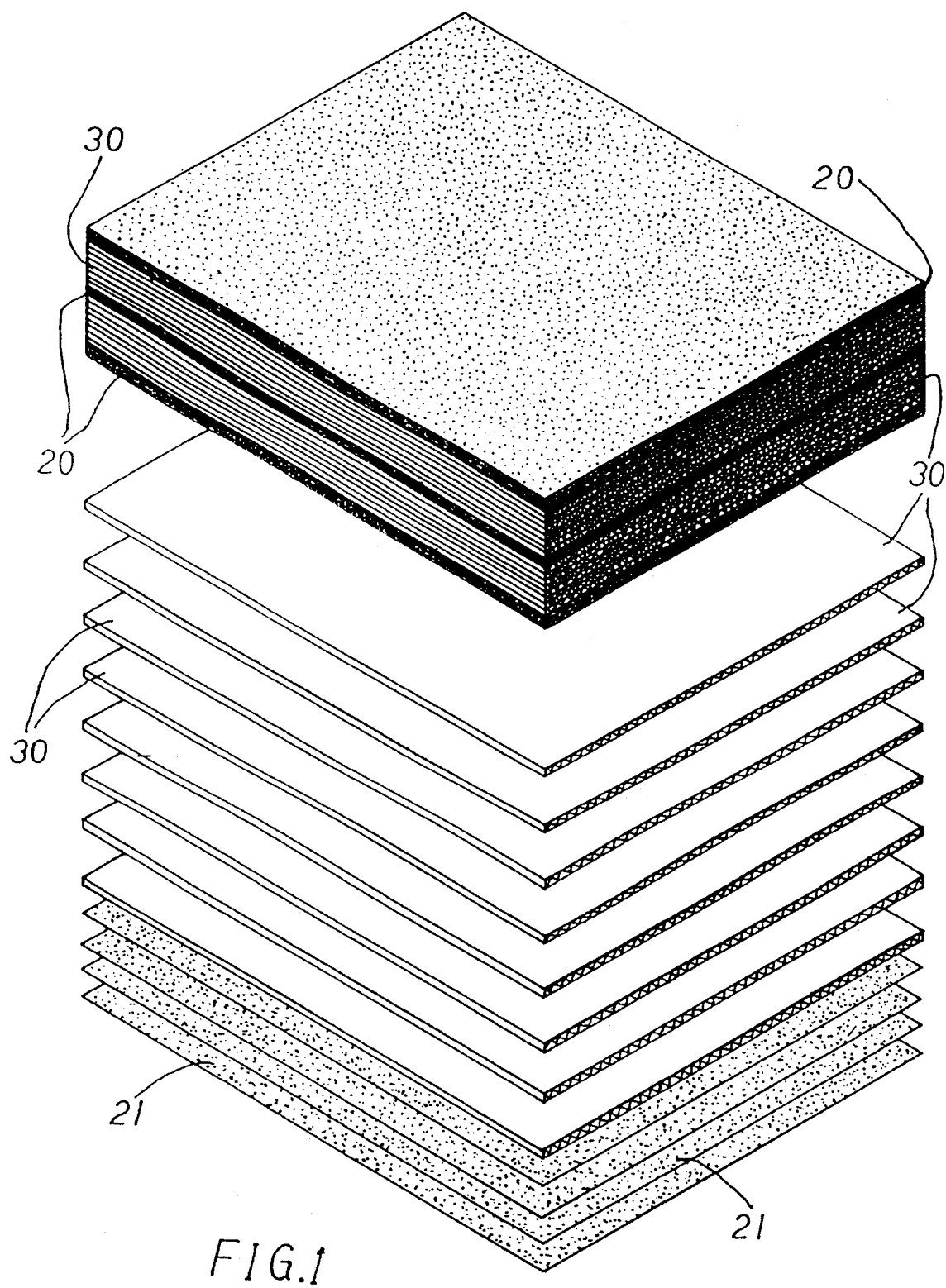
FIG. 1 is a perspective exploded view of the scaffold board block according to the present invention

Please refer to FIG. 1. The present invention includes the following steps:

Board-laminating procedure: four (or more or less, depending on the load to be born) layers of carton boards 21 with high thickness and a basic weight of 700g/m² are closely attached to one another by white glue or amyloid glue to form a thick board 20, and then eight (or more or less, depending on the load to be born) layers of three-layer corrugated boards 30 which have high strength and are made of A-class flock paper and kraft paper with high basic weight are attached in sequence on the thick board 20 by white glue or amyloid glue, wherein the layers of three-layer corrugated boards to form an intermediate board, and then another thick board 20 and another intermediate board are twice further attached on the first intermediate board, and finally an upmost layer of thick board 20 is attached on the last intermediate board.

Figure 2:
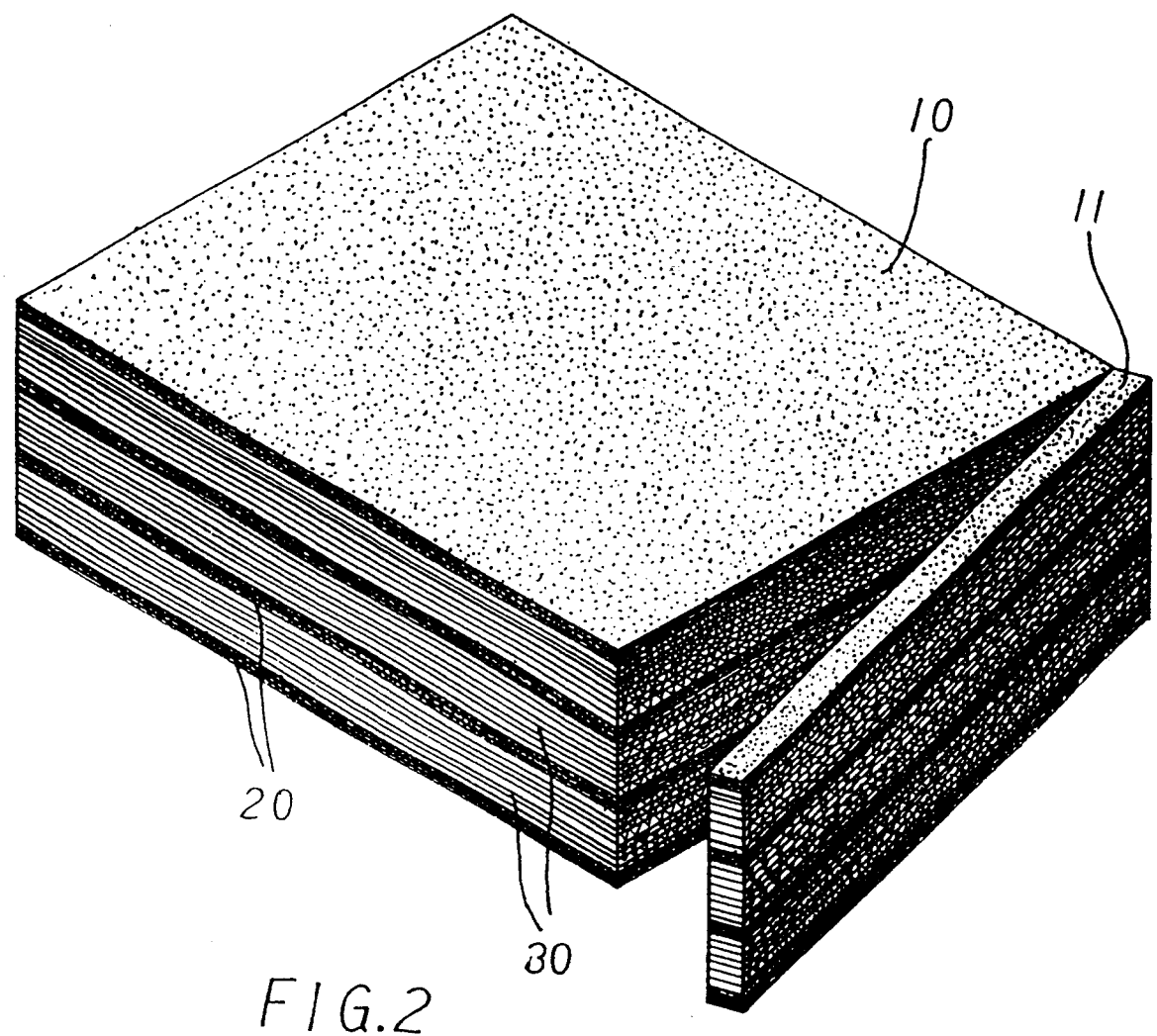
FIG. 2 is a view according to FIG. 1, wherein a piece of scaffold board is cut away from a scaffold board block.

High frequency drying and patterning procedure: the laminated board block is heated by high frequency and compressed and quickly dried and patterned to form a solid assembled board block structure 10 as shown in FIG. 2. Accordingly, by means of the high strength the carton board and the gluing and hardening effect of the assistant white glue (amyloid glue), the hardness of the produced board block reaches about 50–60% of the hardness of the timber-made board.

Cutting procedure: As shown in FIG. 2, a piece of scaffold board 11 with appropriate width is cut away from the board block 10 according to the requirement of use.

Thermo-melting glue-reinforcing procedure: A layer of solvent-free thermo-melting glue (EVA, ethylene—vinyl acetate resin) is painted on external surface of the cut scaffold board 11. The thermo-melting glue will quickly harden.

Edge-planing procedure: The irregular edge of the layer of thermo-melting glue painted on the surface of the scaffold board 11 is planed by an electro-thermally planing device.

Figure 3:
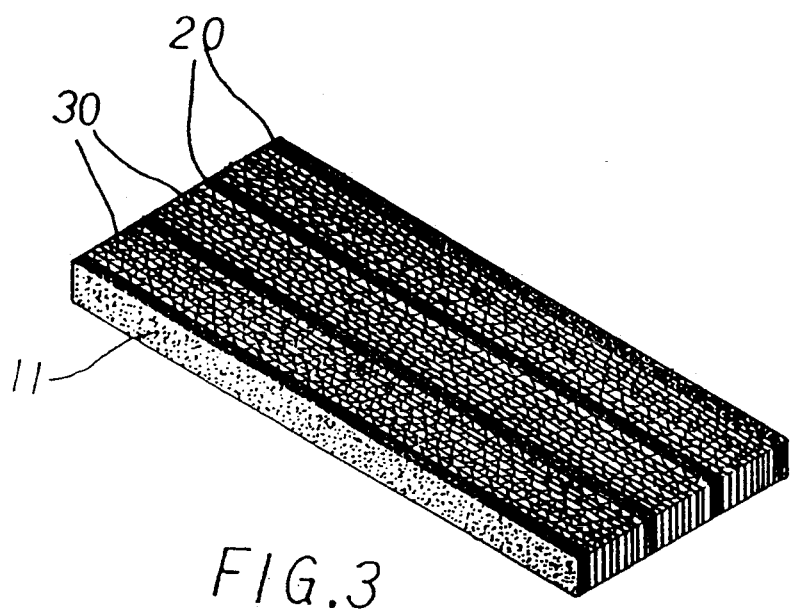
FIG. 3 shows that the cut scaffold board is horizontally placed.

As shown in FIG. 3, if the scaffold board 11 produced through the above procedures is horizontally placed, by means of the carton boards 21 and the waved intercrossed ribs in the corrugated boards 30, the compression-resistance of the scaffold board 11 is almost over 90% of that of the timber-made scaffold board. After the thermo-melting glue is painted on the external surface of the scaffold board 11, the hardness and compression-resistance thereof are almost 100% of those of the timber-made scaffold board.

According to the above arrangements, the scaffold board produced by the method of the present invention has the following advantages:

1. The scaffold board of the present invention can be recovered for reproduction without causing pollution of environment.
2. The present scaffold board has lighter weight so that the transfer or displacement thereof can be easily performed.
3. The present scaffold board can be automatically mass-produced.
4. After discarded, the present scaffold board is subject to natural decomposition so that the environment will not be polluted.
5. The area of the denuded forest can be reduced.
6. The present scaffold board is manufactured at lower cost so that the price thereof is reduced to enhance the competitive ability of the manufacturer.
7. The corrugated board is made of recovered waste paper and can be recircularly reproduced so that the natural resource can be best utilized.

It is to be understood that the above description and drawings are only used for illustrating one embodiment of the present invention, not intended to limit the scope thereof. Any variation and derivation from the above description and drawings should be included in the scope of the present invention.

What is claimed is:

1. A method for manufacturing high hardness kraft paper-made board block, comprising the following steps:

board-laminating step, wherein multiple layers of carton boards with high thickness and a basic weight of 700 g/m² are closely attached to one another by white glue or amyloid glue to form a thick board, and then multiple layers of three-layer corrugated boards which have high strength and are made of A-class flock paper and kraft paper with high basic weight are attached in sequence on said thick board by white glue or amyloid glue, wherein said multiple layers of three-layer corrugated boards form an intermediate board, and then another thick board and another intermediate board are twice further attached on the first intermediate board, and finally an upmost layer of thick board is attached on the last intermediate board;

high frequency drying and patterning step, wherein the laminated board block is heated by high frequency and compressed and quickly dried and patterned to form a solid assembled board block structure:

cutting step, wherein a piece of scaffold board with a predetermined width is cut away from said board block according to requirements of use;

thermo-melting glue-reinforcing step, wherein a layer of solvent-free thermo-melting glue is painted on external surface of the cut scaffold board to quickly harden; and edge-planning step, wherein irregular edges of said layer of thermo-melting glue painted On the surface of said scaffold board are planed by an electro-thermally planing device.

2. A method according to claim 1 wherein said solvent-free thermo-melting glue is ethylene-vinyl acetate resin.

* * * * *